Aug. 12, 1969    E. G. PAYNE    3,460,276
BISTABLE VISUAL DISPLAY DEVICE
Filed Sept. 16, 1968    5 Sheets-Sheet 1
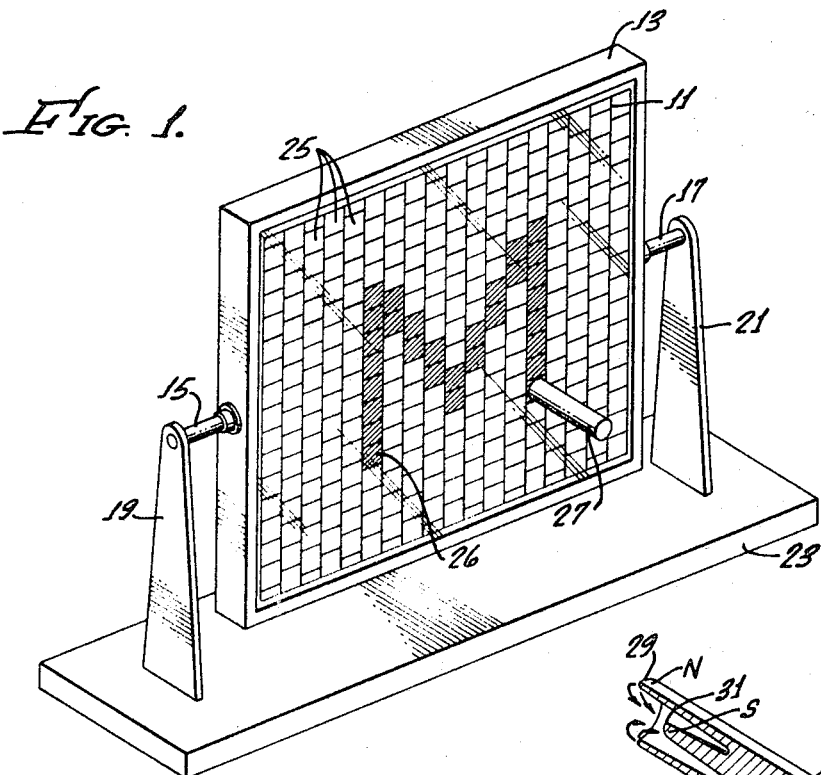
Fig. 1.
Fig. 1a.
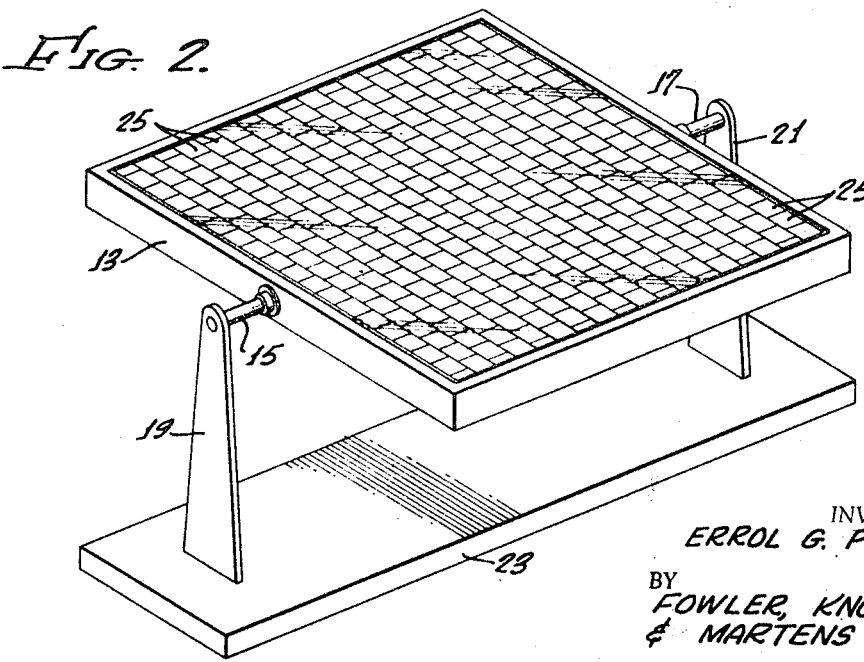
Fig. 2.
INVENTOR.
ERROL G. PAYNE
BY
FOWLER, KNOBBE
& MARTENS
ATTORNEYS.

Aug. 12, 1969  E. G. PAYNE  3,460,276
BISTABLE VISUAL DISPLAY DEVICE
Filed Sept. 16, 1968  5 Sheets-Sheet 2

INVENTOR.
ERROL G. PAYNE
BY FOWLER, KNOBBE
& MARTENS
ATTORNEYS.

INVENTOR.
ERROL G. PAYNE
BY
FOWLER, KNOBBE
& MARTENS
ATTORNEYS.

Aug. 12, 1969  E. G. PAYNE  3,460,276
BISTABLE VISUAL DISPLAY DEVICE
Filed Sept. 16, 1968  5 Sheets-Sheet 4

INVENTOR.
ERROL G. PAYNE
BY
FOWLER, KNOBBE
& MARTENS
ATTORNEYS.

3,460,276
BISTABLE VISUAL DISPLAY DEVICE
Errol G. Payne, Newport Beach, Calif., assignor to
 Peripheral Data Machines, Inc., a corporation of
 California
Filed Sept. 16, 1968, Ser. No. 762,202
Int. Cl. B43l 1/00; C09f 11/00
U.S. Cl. 35—66                                    9 Claims

ABSTRACT OF THE DISCLOSURE

A display board having a transparent front panel and a core honeycombed by an array of transversely extending non-intercommunicating duct-like cells partially filled with magnetic powder. The cells are so configured that the board can be erased simply by holding it horizontally, with the transparent front panel up. To write on the board it is tilted into an upright position and a magnetic stylus is drawn across its transparent front panel, whereupon powder is shifted to the visible front portion of the cells along the path of stylus.

The disclosure includes a preferred embodiment in which the honeycombed core is formed from a laminated stack of specially corrugated sheets. The disclosure also includes a method for manufacturing such a core, and a display panel incorporating it, and a particularly effective tool for forming the corrugated sheets from which the laminated stack for the core is assembled.

BACKGROUND OF THE INVENTION

Field of the invention

This invention relates to visual display devices and more particularly to a display device featuring a panel which incorporates a readily erasable writing material, in contradistinction to conventional media onto which the writing material must be transferred, as from a chalk, pencil, pen or printing press.

Description of the prior art

Several efforts have been made in the past to replace the blackboard and the chalk with a device upon which a message may be "written" without transferring a part of the stylus, i.e. chalk. Attempts have also been made in the related field of display devices to provide panels upon which different alphanumeric characters can be displayed in rapid succession.

One approach has been the use of rotatable spheres, or rotatably mounted minute panels having contrasting colors on their opposite sides, distributed in a plane and turned magnetically in a selected pattern to display a desired indicium. A second approach has been to suspend magnetic particles in a non-magnetic liquid confined in a shallow, relatively large area covered by a transparent panel. To write upon such a device, a magnetic stylus is drawn in a desired pattern across the transparent window of the device, forming a trace of magnetic particles attracted to the panel thereby.

A third approach has involved hydraulically damped magnetic pins slidably confined in parallel bores which extend transversely through a board having a transparent front panel. Selected ones of the magnetic pins are attracted toward the transparent front panel by means of a magnetic stylus drawn along its surface in a desired configuration.

The inherent limitations of the above three approaches are apparent. Rotatable spheres and rotatably mounted panels are expensive to manufacture and are limited in the minimum size to which they can be reduced. As a result, such devices are best adapted for large scale displays in which definition at short distances is not a critical requirement. Display panels containing magnetic particles suspended in a liquid are costly to manufacture because of the provisions which must be made to prevent loss of the liquid therein. Even when such provisions have been made, the risk of seepage persists. Display devices using hydraulically damped magnetic pins are similarly handicapped by the presence of the fluid in them. Furthermore, they too are costly to manufacture because of the close manufacturing tolerances which must be maintained between the pins and the bores in which they are held.

SUMMARY OF THE INVENTION

An exemplary visual display device constructed in accordance with the invention and disclosed in detail herein includes a body having a pair of substantially co-extensive walls and a core between them. Extending transversely through the core between the walls and terminated by those walls is an array of ducts each of which is isolated from all the others. The ducts are all curved so that each of them is humped, with oppositely sloping sides extending from the walls toward one another and meeting at a common peak. Within each duct, filling it partially, is a charge of opaque material whose consistency is such as to allow it to flow freely through the duct in which it is contained from one of the walls terminating that duct to the other. Due to the humped shape of the ducts, once one or more of the charges of material have been made to flow to either one of the walls, they remain locked there by the force of gravity, provided the body of the display device is generally upright. To permit the charges of material in the ducts to be visible for display purposes, at least one of the walls is made light transmitting in those areas where it terminates the ducts, thereby displaying the charges of material which have been drawn against it.

The display device is initially cleared by holding it horizontally and shaking it gently to move the charges of material to the rear of the curved ducts. When the device is subsequently turned upright, all of the charges are held at the rear of the ducts by gravity and are invisible from the front. In the exemplary embodiment to be described, the material is a magnetic powder, and it is thrust forward in selected ones of the curved ducts along their longitudinal axes and over their humps by means of a magnetic stylus which is drawn along the transparent front wall of the device in the outline of the particular indicium that is to be displayed. Once the charges of powder in the selected ducts have been thrust forward and are literally "over the hump," they come to rest upon the sloped front portions of the ducts, against the transparent front wall of the panel and are held there, again by gravity.

The entire image thus displayed can be erased by retilting the panel into a horizontal position so as to cause the powder which had been driven toward the transparent front wall to fall out of sight, back against the opposite wall of the panel.

It is a significant advantage of a display device made in accordance with the invention, that the image or indicia thus displayed can be viewed from any angle. This advantage is due to the geometry of the curved ducts which is such that any duct in which the charge of powder has been driven toward the transparent front wall is completely obscured and appears as an area having the color of the powder. To assure sharp contrast from any viewing angle, any duct whose charge of powder has been left in its rear portion will obscure the charge so that it is completely invisible from the front.

Another important advantage of the invention, also derived from the configuration of curved ducts, is that it lends itself to a wide variety of uses and permits the device to be made inexpensively yet reliably. The wide scope of use of the display device constructed in accordance with the invention is due to the fact that it can be made with widely varying duct sizes. Thus, where high resolution is desired, 250 ducts per square inch are attainable. For large scale applications such as billboards, on the other hand, ducts can be made to have a cross-sectional area of one square inch or even larger.

The provision of a method for fabricating a display device having curved or angled ducts forms another important feature of the invention. In accordance with this method, a plurality of substantially identical sheets is mass produced, these sheets being corrugated so that each of them defines a series of parallel, alternately oppositely opening channels. The sheets are further corrugated at right angles to the first series of corrugations to form a series of gabled, or "inverted-V" shaped sections. Each of these gabled sections serves to form the floor or the ceiling of a row of humped ducts in the display device to be manufactured. A plurality of the corrugated sheets are then stacked in staggered relationship, so that oppositely opening channels in adjacent sheets are aligned. Thus aligned, the block of stacked sheets is sliced in a plane which is at right angles to the planes of the individual sheets making up the block, the slice being made between successive ones of the gabled sections so as to form with each slice a rectangular laminated core having an array of angled ducts defined by the oppositely opening channels of the successive sheets. A panel is then bonded to one side of each rectangular core so as to terminate its ducts at one of their ends and each of the ducts is partially filled with a charge of material, such as magnetic powder. The process is completed by bonding a light-transmitting panel to the other side of each of the partially filled, laminated cores to terminate their ducts at their opposite ends.

In considering the described process for manufacturing a display board incorporating features of the present invention it will be noted that most of the steps that are involved, such as stacking, slicing, and bonding are straightforward and within the ability of those skilled in the manufacturing arts. It is apparent that the most difficult one of the steps listed is that of forming the corrugated sheets so as to define oppositely opening channels in one direction and gabled sections along a second direction. In another of its aspects the present invention contemplates a novel tool for forming sheets of the desired corrugated configuration. In accordance with this aspect of the invention such a tool comprises two sets of similar plates, each plate having one of its edges formed in a saw-toothed configuration. Indeed, in the preferred embodiment of the tool illustrated herein, each of the plates resembles a thick saw blade. The plates making up the first and second set are stacked alternately, with the saw-toothed edges of alternate ones of the plates being mutually aligned and with the saw-toothed edges of adjacent plates being staggered in such a way that the saw-toothed edges of the second set of plates are recessed relative to the corresponding edges of the first set of plates by an amount corresponding to the depth of the channels in the corrugated sheet which is to be formed by the tool.

The principal advantage of a tool constructed in accordance with the invention is that the individual plates are easy to manufacture, and once manufactured are easily assembled into the desired stacked configuration, in which they present the relatively complex surface required to form the corrugated sheets of the display device.

BRIEF DESCRIPTION OF THE DRAWINGS

FIG. 1 is a perspective view of a display board incorporating features of the invention, the board being shown in a vertical position with the letter M written on it;

FIG. 1a is a perspective cut-away view of a magnetic stylus suitable for use with the display board of FIG. 1;

FIG. 2 shows the display board of FIG. 1 tilted in a horizontal position in order to erase the letter which had been written on it;

DESCRIPTION OF THE PREFERRED EMBODIMENT

Figure 4:
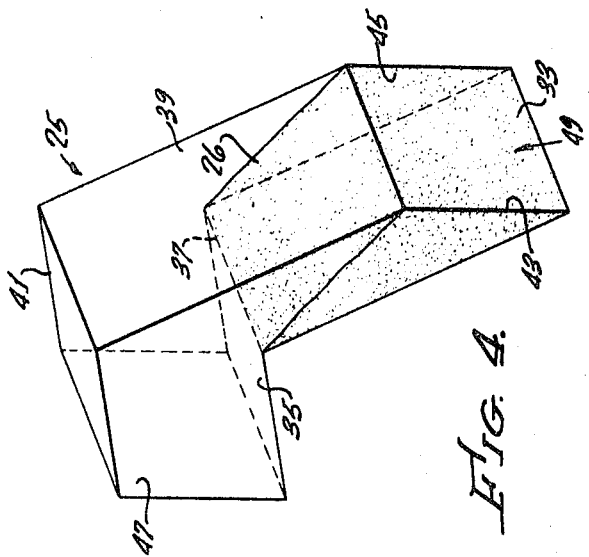
FIG. 4 is a view of the duct shown in FIG. 3 but with the charge of powder in its front portion, to illustrate the "displaying" state of the duct.

An easily erasable writing panel constructed in accordance with the invention is illustrated in FIG. 1 and comprises a writing panel 11 bordered in a frame 13 and rockably mounted through a pair of shafts 15 and 17 and corresponding brackets 19 and 21 upon a base 23. The panel 11 comprises an array of closely spaced ducts 25, each of which contains a charge of material 26 which in the particular membodiment illustrated in FIG. 1 is a magnetic powder such as iron ferrite. Shown next to the panel 11 is a magnetic stylus 27 and the panel is shown in an upright position with the letter M being displayed on it. As will be explained in greater detail subsequently, the letter M is written on the panel 11 by drawing the stylus 27 along the surface of the panel to trace out the letter, causing those charges of magnetic powder 26 which are contained in ducts 25 located in the path traced out by the stylus 27 to be drawn forward against the front of the panel 11, made transparent so as to display them. A stylus particularly adapted to this purpose is shown in FIG. 1a. It has a generally cylindrical outer portion 29 magnetized to form a north pole and a central recessed tip 31 which is coaxial with the outer portion 29 and magnetized to form a south pole. Accordingly, lines of magnetic force extend generally inwardly toward the recessed tip 31 of the stylus 27 so that, when the stylus is placed against the transparent surface of the writing panel 11, the magnetic particles 26 which are contained in the ducts 25 nearest the stylus are attracted toward it and therefore toward the transparent surface of the panel.

To erase the panel, it is tilted backward into a horizontal position as shown in FIG. 2. This causes the powder 26 in all of the ducts 25 to drop to the rear where they become invisible from the front of the panel due to the ducts' configuration. In accordance with an important feature of the invention, this configuration is bistable; that is, the charge of powder 26 in each duct 25 has two stable positions when the panel is upright, as in FIG. 1. In one of these positions the charges of powder 26 are held at the rear of the ducts 25 and are invisible from the front. This is the position which they attain when the panel 11 is tilted horizontally, as shown in FIG. 2 and they retain this position even after the panel is returned to its upright position. In their other stable position the charges of powder 26 are held against the transparent front wall of the panel 11, a position into which they are urged by a transverse force such as that which is exerted upon them by the lines of force generated by the magnetic stylus 27 in the manner just explained. It is this bistable characteristic of the ducts which permits the panel 11 to be erased quickly by being tilted into a horizontal position and to remain in such an erased condition even after it has been returned to an upright position to receive another indicium or message.

Figure 3:
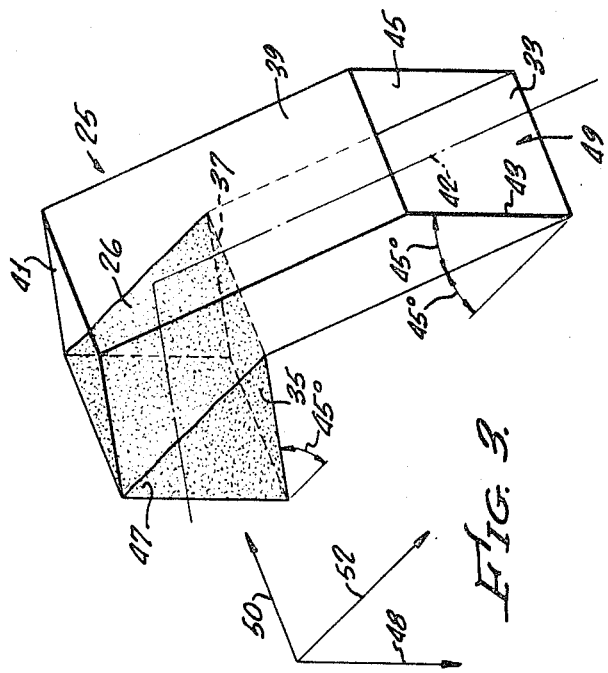
FIG. 3 is a perspective diagram showing a single bistable duct of the type used in the display device shown in FIG. 1, with the charge of powder contained in the duct being confined to its rear portion, representing the erased state of the duct.

The principle of the bistable ducts 25 is best illustrated in FIGS. 3 and 4, showing the ducts oriented as they would be when the panel 11 is upright. Referring to FIG. 3 first, the duct 25 is comprised of a pair of oppositely inclined slopes 33 and 35 meeting at a common peak 37. The slopes 33 and 35 form the floor of the duct 25 which also includes a corresponding pair of sloped surfaces 39 and 41 forming the roof of a duct. A pair of walls 43 and 45 connects the floor portions 33 and 35 to the roof portions 39 and 41. The longitudinal axis of the duct 25 is indicated in FIG. 3 by the line 42 centered between the floor portions 33 and 35, roof portions 39 and 41, and walls 43 and 45 of the duct. In the panel 11 illustrated in FIG. 1, the rear ends 47 of the tunnels 25 are terminated by a rear wall which may be integral with the panel but which is usually bonded thereto as a separate member. This wall may or may not be transparent. The front ends 49 of the ducts 25 are bonded and terminated by a transparent front panel. Neither the back nor the front panel is shown in FIG. 3, for sake of clarity. However, during the following discussion of the ducts 25, it will be assumed that the duct ends 47 and 49 are terminated by end walls.

Confined within the rear portion of the duct 25 in FIG. 3 is a charge of material 26 which could be a liquid but which in the preferred embodiment of the invention is a powder. In FIG. 3 the powder 26 is shown in the position which it occupies when the panel 11 is erased. It is caused to assume that position by tilting the panel horizontally, as in FIG. 2, which will cause the duct 25 to be turned to a position at 90° from that shown in FIG. 3. It will be apparent that this change in position will cause all of the powder 26 in the duct which may have been on the front slope 33 to slide toward the rear, over the peak 37, and onto the rear slope 35 of the duct. When the panel 11 and the ducts 25 are returned to their original positions, as shown in FIGS. 1 and 3, the powder 26 remains in the rear of the ducts in the position shown in FIG. 3. This is the first stable position of the ducts.

It is one of the advantages of the invention that, when the panel is erased, that is, when the powder 26 within the ducts 25 is shifted toward the rear, the front of the ducts are clear, free of powder, and from a conventional viewing position, the ducts 25 assume the color of their inside surfaces 33, 43 and 45. For this reason the amount of powder 26 within the duct 25 is limited so that it occupies no more than the volume of the rear portion of the duct 25 below the peak 37. In practice, the level of powder usually will not rise exactly to the peak 37 because this would cause some of the powder to spill over into the front portion of the duct 25 when the panel 11 is even slightly tilted from a perfectly vertical position. It is only necessary to place a sufficient amount of powder in the duct so that when the powder is drawn forward, it covers substantially the entire front 49 of the duct, the front which is terminated by the transparent front wall of the writing panel 11.

In order to insure further that the powder 26 in the rear of the duct 25 will not be visible from the front from any viewing angle, in accordance with a specific aspect of the invention the duct is so configured that no portion of its rear end 47, which is terminated by the rear wall of the writing panel 11, is visible from its front, or viewing, end 49. Specifically, the sloped floor 33 of the duct 25 rises at a sufficiently steep angle and is sufficiently long relative to the height of the front end 49 of the duct 25 so that the floor 33 rises at least as high as the top of the front end 49. In the duct illustrated in FIG. 3 this configuration is attained by selecting a 45° angle between the floor portions 33 and 35, and the front and rear ends 49 and 47 respectively, and by making the distance between the ends 49 and 47 equal to twice the height of those ends.

The duct 25 is shown with its charge of powder 26 in its second stable state in FIG. 4. To transport the powder to this state from its previous state at the rear of the duct 25, a transverse force is applied to it, which may be either a repelling force applied at the rear duct end 47 or, as illustrated in FIG. 1, an attracting force applied at the front duct end 49.

With the proper amount of powder 26 in the duct 25 the entire front end 49 is covered with the powder when the latter has been transferred into its second stable position. And, due to the continuous, downward force of gravity, the powder will remain there even after the transverse force has been removed.

It should be understood that the configuration illustrated in FIGS. 3 and 4 has been chosen because it is relatively simple, and because it is particularly suitable for the method of manufacture to be disclosed more fully herein. Naturally it could be modified to suit other manufacturing processes. For example the duct's cross section could be altered to be rectangular, hexagonal, circular or even oval without departing from the scope of the invention.

Moreover it need not be angled at the top as shown but may be curved instead, with its oppositely inclined slopes, which may be either flat or slightly concave either upward or downward, merging smoothly at the top so that, whether "angled" or "curved," the duct 25 is humped along its longitudinal axis 42 at a peak intermediate its ends. Indeed, when used with reference to the duct 25 herein, the words "angled" and "curved" are interchangeable.

Summarizing the foregoing description of a display device incorporating features of the invention, it is seen to comprise principally a body having a pair of walls, at least one of which is light transmitting. Both walls extend along mutually orthogonal principal and lateral axes whose orientation relative to the ducts 25 is shown in FIG. 3 by the vectors 48 and 50. Referring still to FIG. 3, the front and back walls of the body are spaced apart along a transverse axis which is orthogonal to the first axes and whose direction is indicated in FIG. 3 by the vector 52. Sandwiched between the front and back walls of the body and co-extensive with them in a core through which extends an array of similarly angled, humped ducts spaced apart along the principal and lateral axes from one of the walls to the other so that the opposite ends of each of the ducts are terminated by the walls. A charge of magnetic particles partially fills each of the ducts, each charge being capable of flowing freely through the duct containing it, from one of the walls of the display device to the other, when so urged by magnetic force along the transverse axis.

Continuing with the above summary, in keeping with the invention each duct includes a pair of slopes which are oppositely inclined relative to the transverse axis and which extend toward a common peak from a pair of bases at respective ones of the walls of the device. These bases correspond to lines at which respective ones of the slopes 33 and 35 in FIG. 3 intersect with the respective ends 49 and 47 of the duct 25. As a result of this configuration, when a force such as the force of gravity is continuously exerted upon the charges of material within the ducts along the principal axis in a direction away from the peak at which the slopes intersect, these charges respond to a momentary magnetic force exerted upon selected ones of them in any desired pattern in either direction along the transverse axis by moving along their respective ducts to the wall toward which they are being urged by the momentary force. Moreover, they come to rest against this wall under the influence of the continuous force, forming a two-dimensional pattern of magnetic particles which is representative of the pattern in which the momentary magnetic force was exerted.

In the foregoing description of a display device constructed in accordance with the invention, repeated reference has been made to the force of gravity, both in erasing a pattern drawn upon the device and with reference to the continuous force which gravity would normally exert along the principal axis of the device upon the powder within its ducts so as to bias them into one of their stable states or positions within the ducts. Gravitational force is merely one of many which might be employed for both erasing and biasing the display device of the invention. For example, in a gravitation-free environment such as that of outer space, the biasing force might be exerted along the principal axis of the device by means of a permanent magnet, provided, of course, that the powder within the ducts is magnetic. Moreover, even where the display device of the invention is to be used where there is gravitational force, it need not be erased by the use of that force, as it is when the device is tilted into a horizontal position as shown in FIG. 2. Instead, an eddy current "eraser" could be used. Such an eraser would have the particular advantage that it could be used to erase portions of the display device selectively, much in the manner in which a conventional eraser is used to clear a blackboard. The eddy current eraser, when held against the front of the display device, would induce eddy currents in the magnetic particles contained in the ducts 25 against which the eraser is being held. The particles would be made electrically conductive for this purpose, and the induced currents would have the effect of repelling the magnetic particles away from the front wall of the device so as to thrust all of the particles of powder against its rear wall. Alternatively, a bar shaped magnetic eraser could be drawn over the rear wall of the device so as to attract the magnetic particles away from the front wall of the device toward its rear wall in the same manner in which those particles had been attracted toward the front wall during the initial writing process by means of the stylus 27 of FIG. 1a.

The ability, alluded to briefly in the previous paragraph, to erase the display device from the rear suggests yet another application for it, that of large tactical display boards upon which the mirror images of characters are written on one side so that, when viewed from the opposite side, the characters appear in readily readable form. Presently such boards are made of transparent plastic, and the mirror images are written on them by conventional writing means whose traces must be erased. Such a device could be replaced by a large board constructed in accordance with the invention and having electrically conductive magnetic particles in its ducts. Both the front and the back panels of the board would be light-transmitting to permit viewing from the rear, and the mirror images of the characters which are to be viewed on the front of the panel would be written upon the rear of the board with an eddy current stylus, operative to repel electrically conductive magnetic particles in the ducts of the panel forward toward the front wall of the panel by inducing eddy currents in them. The images thus displayed could be readily erased from the rear of the panel by means of a magnetic eraser in the manner just described.

It is a very valuable feature of the invention that a display panel utilizing the principle of bistable ducts can be produced inexpensively in large quantities. A preferred method for manufacturing a display board operating on these principles is outlined generally in FIG. 5. The first step in the process is to form a plurality of corrugated sheets 51, one of which is shown in FIG. 6. Each of the sheets 51 is corrugated along a first axis 53 to define a series of parallel channels 55a and 55b, alternate ones of which open in opposite directions, and all of which extend along a second axis 57 which is at right angles to the first axis 53. Each of the sheets 51 is additionally corrugated along the second axis 57 in a zigzag pattern to form a series of gabled sections 59, each of which includes a row of oppositely opening channel portions 55a and 55b, with each of these portions having a pair of oppositely inclined sloped surfaces, shown as the surfaces 61 and 63 for channel portions 55a and as the surfaces 65 and 67 for the channel portions 55b.

Figure 7:
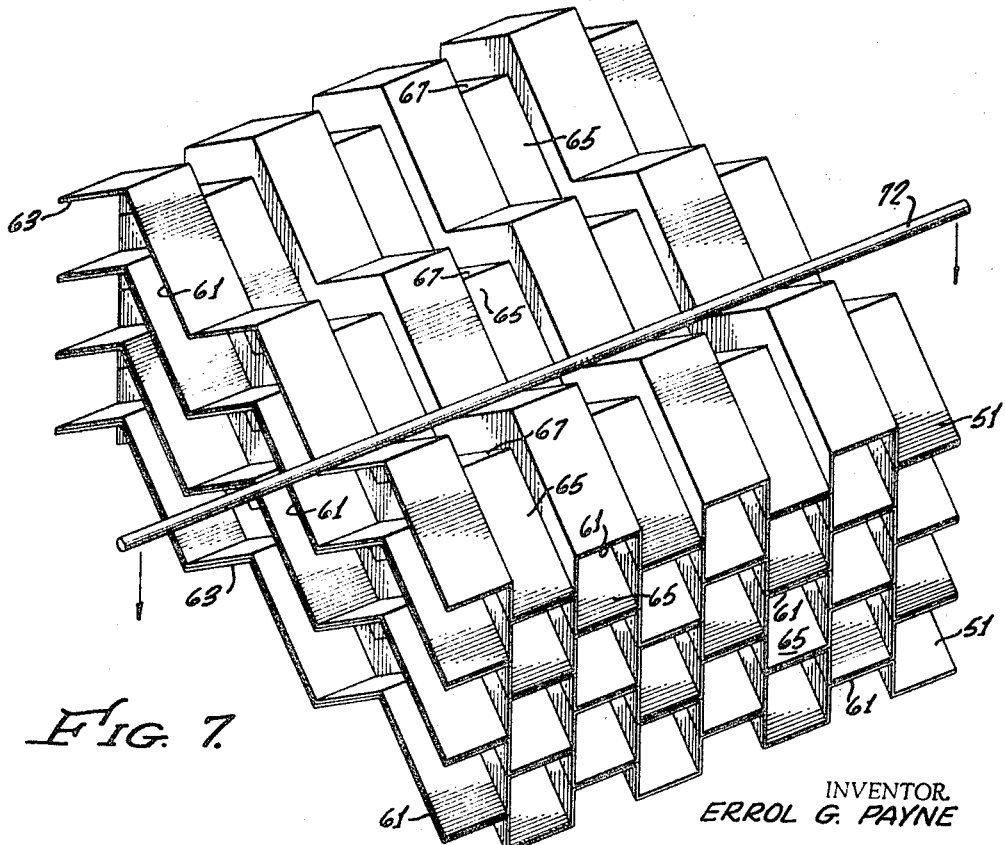
FIG. 7 is a perspective view of a column of sheets of the type shown in FIG. 6 stacked in a staggered relationship in accordance with another of the steps shown in block form in FIG. 5.

After a sufficient number of sheets 51 have been formed, they are stacked as shown in FIG. 7. Thus, the sheets 51 are so aligned that the oppositely opening channels 55a and 55b in adjacent ones of the sheets 51 are opposite one another so as to form a plurality of continuous ducts. The stacked sheets 51 are then bonded together into a unitary laminated block. A suitable method of bonding the stacked sheets, particularly when the sheets are formed of a soluble material such as styrene is to spray the sheets with a solvent prior to or during their being assembled into a stack.

Figure 7A:
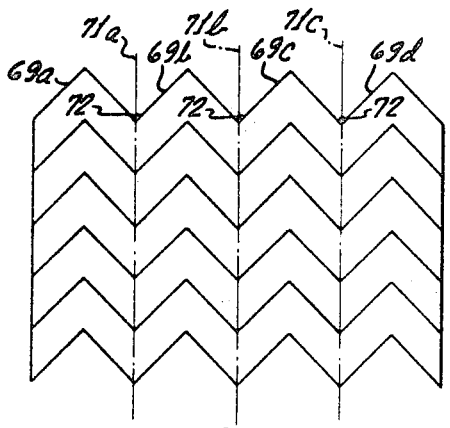
FIGS. 7a and 7b are side and front views respectively of the stacked sheets illustrated in FIG. 7, FIG. 7a additionally showing lines along which slices are made in the stacked sheets in accordance with another one of the steps illustrated in FIG. 5 to form a plurality of flat honeycombed cores.
Figure 7B:
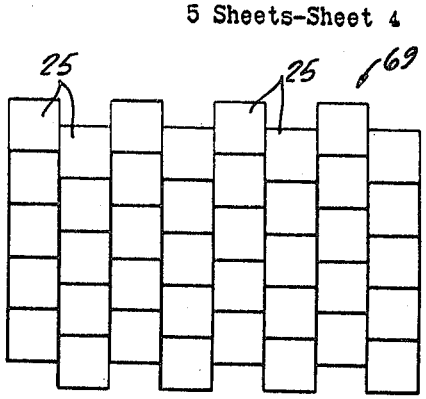

Following the bonding operation, the unitary laminated block of corrugated sheets is sliced at right angles to the first and second axes 53 and 57 between successive ones of the gabled sections 59 so as to form with each slice a rectangular core 69 having an array of angled ducts 25 defined by the oppositely facing channels 55a and 55b. The lines along which the slices are made, as well as the configuration of the rectangular cores 69 and their array of ducts 25 are best seen in FIGS. 7a and 7b. Thus, in FIG. 7a which is a side view of the stack of sheets shown in FIG. 7, the planes along which the stack of sheets shown in FIG. 7, the planes along which the stack is sliced are represented by the lines 71a, 71b, and 71c, resulting in four separate core panels, 69a, 69b, 69c, and 69d respectively. In practice, the unitary laminated block would have a much larger number of gabled sections 59, of the order of between 50 and 100, thus increasing further the efficiency with which the core planes 69 can be manufactured.

A suitable tool for performing the slicing operation is an electrically heated Nichrome wire 72 held taut by suitable means and drawn down through the block between successive ones of the gabled sections 59 as indicated in FIG. 7. The configuration of the laminated block makes this method of slicing particularly suitable, since the Nichrome wire is automatically centered between the oppositely inclined slopes of adjacent ones of the gabled sections 59 when urged downwardly to execute the slice between them. In carrying out the slicing operation it has been found that, in the process of melting the stacked sheets 51 through which it slices, the hot Nichrome wire also tends to bond together their edges along the slicing plane. Accordingly, it is to be understood that the step of bonding the stacked sheets 51 together need not take place prior to the step of slicing them. To the contrary, both steps may be performed concurrently by the heated wire, or other such cutting means.

The height of the resulting core plane 69 will be determined partly by the depth of the channels 55a and 55b formed in the corrugated sheets 51 and partly by the number of such sheets which are stacked upon one another before bonding them together. The width of the resulting core plane 69 on the other hand, will be determined by the width of the channels 55a and 55b and by the number of such channels in the corrugated sheets 51.

Figure 8A:
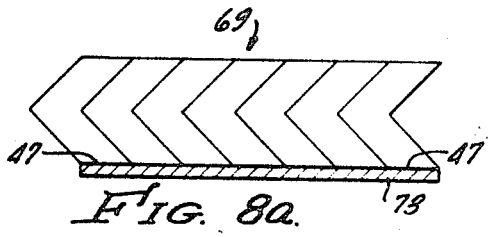
FIG. 8a and 8b are side and front views respectively of one core produced by the slicing step indicated in FIG. 7a and of a panel which is bonded to one side of the core in accordance with a subsequent step of the process illustrated in FIG. 5.
Figure 8B:
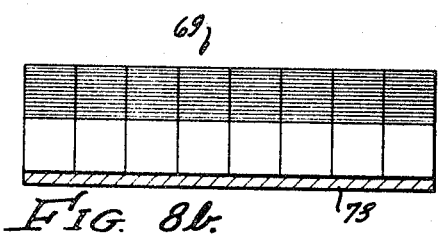

Each of the core planes 69 fabricated by the steps described thus far is honeycombed by ducts 25 whose configuration corresponds to that of the ducts illustrated in FIGS. 3 and 4, whose ends 47 and 49 must now be sealed. To seal the rear ends 47 of the ducts 25, a panel 73 is bonded to one side of each core 69, as shown in FIGS. 8a and 8b. The panel 73 may be made of the same material as the corrugated sheets 51, or of some other material soluble by a common solvent and it may be bonded to the core 69 by applying the common solvent to the panel 73 and to the edges of the core walls which define the rear ends 47.

The panel 73 forms the rear wall of a display device incorporating the core 69 and may be either transparent or opaque. In some applications, however, it would be preferable for both the rear and the front walls of the display device to be transparent, so as to permit viewing the device both from the rear and from the front. Indeed it is an important advantage of a display panel constructed in accordance with the invention that it lends itself to viewing from both sides if desirable, with the view from the rear being the negative of the view from the front.

Figure 5:
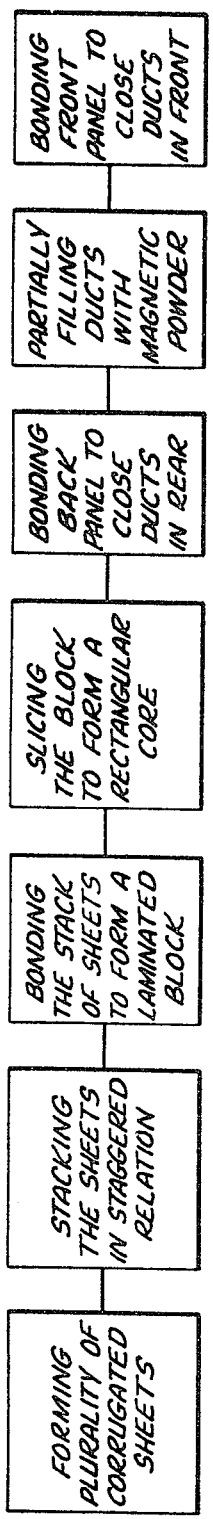
FIG. 5 is a flow chart illustrating the steps which are performed to manufacture a display device in accordance with the invention.
Figure 6:
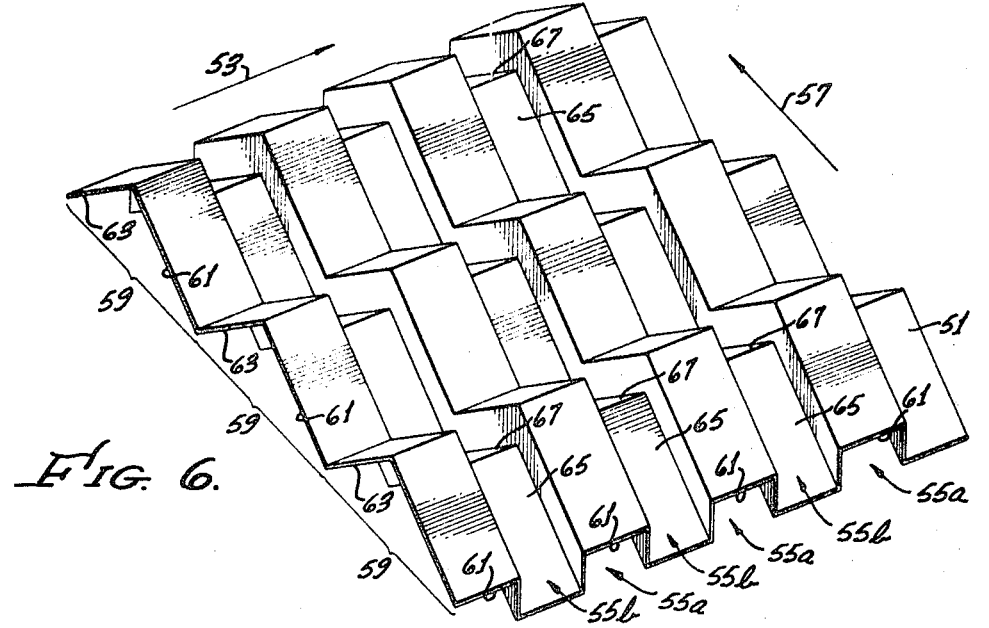
FIG. 6 is a perspective view of a single sheet corrugated along two mutually orthogonal axes in accordance with one of the steps of the process illustrated in FIG. 5.
Figure 9A:
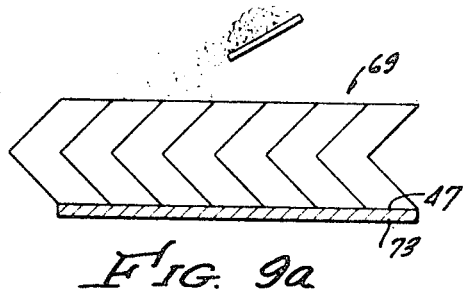
FIGS. 9a and 9b are side and front views respectively of the partially assembled panel of FIGS. 8a and 8b in the process of receiving powder in its array of ducts in accordance with the process shown in FIG. 5.
Figure 9B:
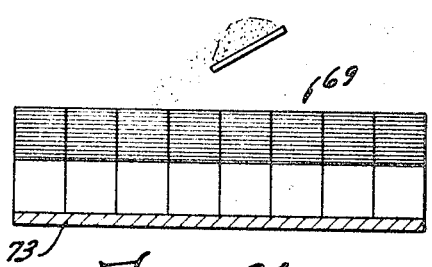
Figure 10:
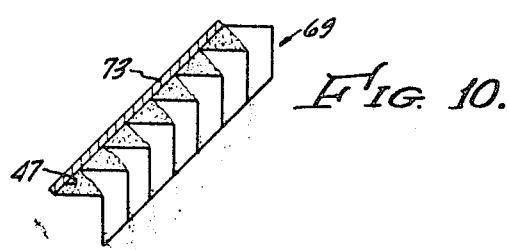
FIG. 10 is a side view of the partially assembled panel of FIGS. 8a and 8b shown turned slightly past an upright position in order to cause all but the desired amount of powder to fall out of its array of ducts in accordance with the process of FIG. 5.

Continuing with the process outlined generally in FIG. 5, after the rear panel 73 has been bonded to the laminated core 69 so as to terminate all of its ducts 25 at their rear ends 47, the ducts are partially filled with a charge of particles 26, such as iron ferrite in the case where the particles are to be magnetic. The correct amount of particles in each of the ducts may be determined by a very convenient process illustrated in FIGS. 9a, 9b, and 10. First the core planes 69, each with a rear panel 73 attached thereto, are substantially filled with the particles 26 as shown in FIGS. 9a and 9b. During this operation the core planes 69 are horizontal. Following this step, the core planes 69 are turned past an upright position as shown in FIG. 10 and are subjected to a slight vibration whereupon, due to the geometry of the angled ducts 25, most of the powder 26 which has been inserted into them falls out and only the proper amount of powder, of the order of that illustrated in FIG. 3, remains in them. The level of the material that remains in the ducts 25 may be determined empirically by changing the extent to which the core planes are turned past the vertical, and also by varying the intensity of the vibration to which they are subjected.

Figure 11A:
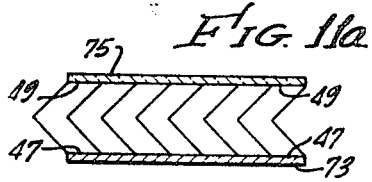
FIGS. 11a and 11b are side and front views respectively of a display device during its last step of assembly in accordance with FIG. 5 wherein a second panel, which is transparent, is bonded to its front face.
Figure 11B:
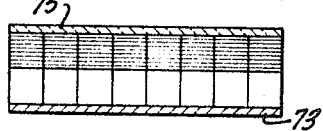

After the ducts 25 have been filled to the proper level, they are sealed at their front ends 49 by means of a light transmitting panel 75 bonded to the edges of the walls of the ducts nearest their ends 49, as shown in FIGS. 11a and 11b. Preferably this operation is effected by heat sealing, since the use of a solvent on the transparent front panel 75 would have an adverse effect on its light transmitting properties.

Figure 12A:
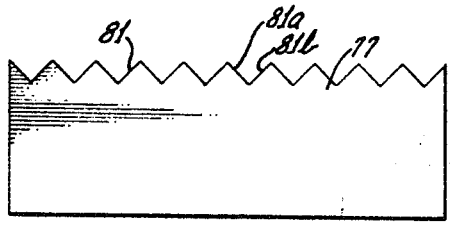
FIGS. 12a and 12b are front views of two plates each of them having a saw-toothed edge but being of different height, these plates being used in a tool for producing the corrugated sheet illustrated in FIG. 6.
Figure 12B:
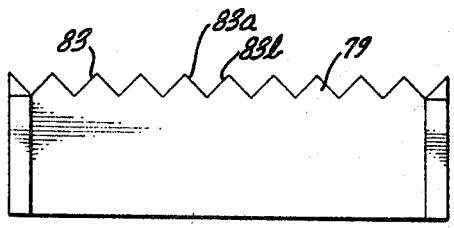

Most of the steps which comprise the disclosed method of fabricating the display panel 11 are relatively easy to perform. The forming of the corrugated sheets 51, however, would at first seem to be quite difficult because of its unique configuration, in which differently shaped corrugations run in two different directions. The provision of an inexpensive tool for rapidly producing the sheets 51 is therefore yet another useful feature of the present invention. Shown in FIGS. 12–15 the tool is comprised of two sets of plates 77 and 79, representative ones of which are shown in FIGS. 12a and 12b respectively. The plates 77 and 79 are similar to one another. They are of the same length, and are provided with identically shaped saw-toothed edges 81 and 83 respectively. A significant difference between the plates 77 and 79 is that the former are higher than the latter, by an amount which is equal to the desired depth of the channels 59 in the sheet 51 to be formed. In the assembled tool, the plates 77 and 79 are tightly stacked in a retaining means, shown in FIGS. 13a and 13b as a tray 85. The shorter plates 79 alternate with the taller plates 77 forming a surface along their saw-toothed edges 81 and 83 which is the exact negative of the corrugated sheet 51. The correspondence between the surface of the tool and that of the corrugated sheet 51 shown in FIG. 6 may be readily established by observing that the series of oppositely inclined surfaces 81a and 81b of the taller plates 77 correspond to the downwardly opening channels 55a in the sheet 51 in FIG. 6 and that the series of oppositely inclined surfaces 83a and 83b of the slightly less tall plates 79 correspond to its upwardly opening channels 55b.

A suitable method used to form the sheet 51 by means of the tool comprising the stacked plates 77 and 79 is that of vacuum forming. With this method a sheet of material is placed on top of the tool and is softened by heat until it is pliable. Concurrently a vacuum is applied to the bottom surface of the tool so as to draw the softening sheet into the recesses of the tool's, saw-toothed top surface. The vacuum is applied to the bottom surface of the tool, by means of the tray 85 which is connected to a source of vacuum through a hose 87 connected to the vacuum tray 85 through a suitable coupling 89. The tray 85 is so dimensioned relative to the total thickness of the stacked plates 77 and 79 that a tight seal is maintained around the edge of the tool to maintain a vacuum at its bottom. Means are also provided to maintain the bottom edges of the plates 77 and 79 at the same level, but above the bottom of the vacuum tray 85 so as to provide communication between the vacuum and all of the stacked plates 77 and 79. Toward this end, in the particular version of the tool shown in FIGS. 13a and 13b, the sides of the vacuum tray 85 are jogged inwardly to provide a ledge 86 upon which the stack of plates 77 and 79 are supported above the bottom of the tray. Since it is the purpose of the vacuum at the bottom of the stacked plates 77 and 79 to draw the material which is laid upon the tops of these plates tightly against the plates, it is important that vents be provided to establish communication between the vacuum which is maintained at the bottom of the stacked plates 77 and 79 and their top surfaces upon which the sheet which is to be molded rests. For this reason, in a preferred embodiment of the tool a wide and shallow slot 91 is milled into both sides of each of the plates 79, as shown in FIG. 14.

Among the several dimensions and relationships of the stacked plates 77 and 79 the most important one is that the saw-toothed edges 81 and 83 of alternate ones of the plates be staggered with respect to one another. In the exemplary embodiment of the tool shown in FIGS. 13a and 13b this is achieved by making one set of plates taller than the other set so that, when they are all supported on a common base as in FIGS. 13a and 13b their saw-toothed edges along the top are staggered in the desired manner. It will be apparent, however, that this staggered relationship could also be achieved by making all of the plates of the same height but supporting alternate ones of them from a slightly higher base.

The thickness of the plates 77 and 79 will be determined by the desired widths of the respective channels 55a and 55b to be formed in the corrugated sheet 51. If the oppositely opening channels 55a and 55b are to have exactly the same width, as in FIG. 7, the plates 77, associated with the downwardly opening channels 55a, will be slightly thinner than the plates 79, which are associated with the upwardly opening channels 55b. The reason for this difference will be apparent from FIG. 15 and it will also be apparent from that figure that the plates 79 should differ in thickness from the plates 77 by an amount which is equal to twice the final desired wall thickness of the corrugated sheets 51.

Figure 13A:
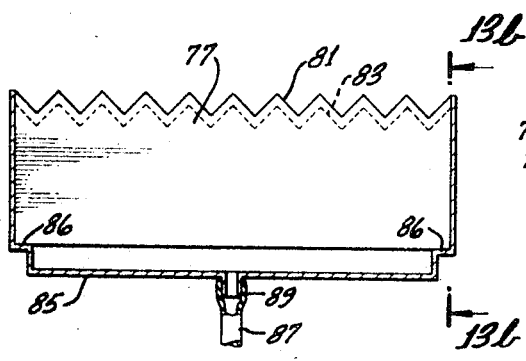
FIGS. 13a and 13b are front and side views respectively of a tool comprised of a plurality of plates as shown in FIGS. 12a and 12b stacked in a staggered array to form a surface which is the complement of the surface of the sheet illustrated in FIG. 6.
Figure 13B:
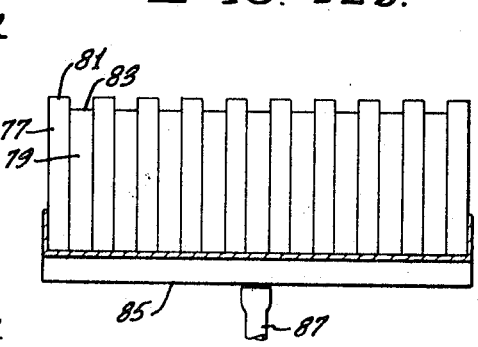
Figure 14:
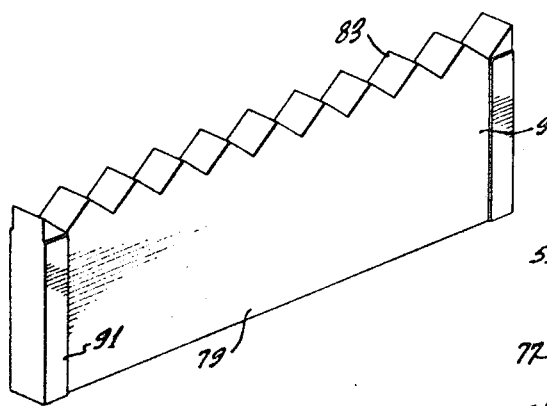
FIG. 14 is a perspective view of a plate of the type shown in FIG. 12a having a channel milled into one of its sides to define an air vent between adjacent plates when they are stacked in the manner shown in FIGS. 13a and 13b.
Figure 15:
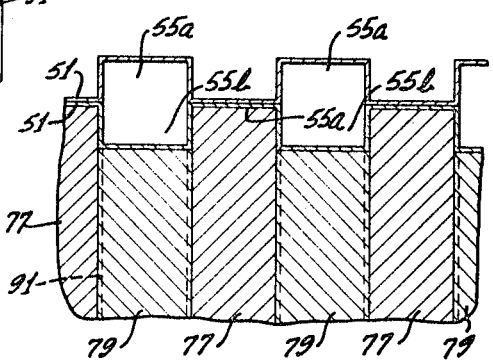
FIG. 15 is a cross section through a limited number of the plates comprising the tool of FIGS. 13a and 13b and through a corresponding section of a corrugated sheet being formed on the tool.

In addition to, or as an alternative for, the vacuum which is applied to the bottom of the forming tool shown in FIGS. 13a and 13b, air under pressure higher than atmospheric may be applied to the sheet placed upon the tool, this pressure acting in a manner similar to vacuum but pressing the sheet onto the tool from above with a greater force than that obtainable by the use of vacuum alone which by its very nature is limited to a pressure differential of about 14.6 pounds per square inch, the pressure exerted by the atmosphere. The use of positive pressure from above to press the sheet into the tool does not change the structural requirements of the tool. Thus, it will still require the venting between adjacent ones of the plates 77 and 79 as well as the clearance between the bottom of the plates 77 and 79 and the bottom of the tray 85 or other means by which they are supported. Naturally, if only pressure from above is exerted and a vacuum from below is not used, the tray 85 need not define a chamber. Instead, a similar chamber will be provided above the top surface of the tool in which the desired pressure can be maintained.

What is claimed is:
1. A display board comprising,
   (a) a body having a pair of spaced apart substantially co-extensive walls and a core extending between them;
   (b) an array of ducts humped along their longitudinal axes and extending through said core between said walls and terminated by them;
   (c) a charge of opaque material partially filling each of said ducts, the charge in each said duct being capable of flowing through said duct individually from one of said walls to the other, and adapted to become and remain lodged alternatively against either one of said walls;
   (d) at least one of said walls being light transmitting in the areas where it terminates said ducts to display the charges which are lodged against it.
2. A display board according to claim 1 and further characterized in that each of said ducts includes a pair of oppositely inclined sloped sections originating from and facing respective ones of said walls and merging at a common apex intermediate said walls.
3. A display board according to claim 2 and further characterized in that each said charge occupies less volume than that provided by one of said sloped sections.
4. A display board according to claim 3 and further characterized in that said sloped sections prevent a direct line of sight between said walls through said ducts.
5. A display device comprising in combination,
   (a) a board having a core and a pair of panels on opposite sides of said core;
   (b) a matrix of angled non-intercommunicating, humped ducts extending through said core between said panels and terminated by them;
   (c) a charge of opaque material locked within and partially filling each of said ducts, each said charge flowing freely and individually through its associated duct from one of said panels to the other when said board is tilted from an upright position and becoming lodged against one of said panels when said board is upright;
   (d) at least one of said panels being light transmitting where it communicates with said ducts to display visually the charges which are lodged against it; and
   (e) means for selectively and momentarily urging toward said at least one panel the material locked within desired ones of said ducts.
6. A display device in accordance with claim 5 further characterized in that said charge of opaque material is a dry magnetic powder and in that said means for selectively urging is a magnetic stylus.
7. In a display device,
   (a) a pair of spaced apart substantially co-extensive panels, at least one of them light transmitting;
   (b) a core sandwiched between said panels, said core having a plurality of walls extending between and sealed to said panels and shaped to define together with said panels an array of isolated, humped ducts communicating at their opposite ends with said panels;
   (c) a charge of opaque material confined within and partially filling each of said ducts, each said charge flowing freely and individually through its associated duct from one of said panels to the other when said board is tilted from an upright position and becoming lodged against one of said panels when said board is upright;
   (d) at least one of said panels being light transmitting where it communicates with said ducts to display the charges which are lodged against it.
8. A display board comprising in combination,
   (a) a body having a pair of walls, at least one of them light transmitting, extending along mutually orthogonal principal and lateral axes and spaced apart along a transverse axis which is orthogonal to said first named axes, said body also having a core substantially co-extensive with said walls and sandwiched between them;
   (b) an array of similarly angled ducts spaced apart along said first named axes and extending through said core from one of said walls to the other so that opposite ends of each said duct are terminated by said walls;
   (c) a charge of magnetic particles partially filling each of said ducts, the charge in each duct being capable of flowing freely from one of said walls to the other when so urged by a magnetic force along said transverse axis;
   (d) said display board being characterized in that each said duct includes a pair of slopes oppositely inclined relative to said transverse axis, extending from a pair of bases at respective ones of said walls and meeting at a peak intermediate said walls so that, when a force is continuously exerted upon said charges along said principal axis in a direction away from said peak and toward said bases, said charges respond to a momentary magnetic force exerted upon selected ones of them in any desired pattern in either direction along said transverse axis by moving along their respective ducts to the wall toward which they are being urged by said momentary force, and coming to rest against said wall under the influence of said continuous force, forming a two-dimensional pattern of magnetic particles representative of the pattern in which said momentary magnetic force was exerted.
9. A display board comprising,
   (a) a body having a pair of flat walls, at least one of them light transmitting, and a core sandwiched between them;
(b) an array of isolated similarly oriented ducts extending transversely through said core between said walls and terminated by them, each of said ducts including a pair of slopes extending from respective ones of said walls toward a common apex intermediate said walls; and
(c) a charge of particles partially filling each of said ducts in an amount capable of being stored entirely on one of said slopes and against one of said walls and, when subjected to a continuous force transverse to the bases of said slopes and in a direction from said apex toward said bases, conditioned to respond to a momentary force exerted in a desired pattern upon selected ones of them in a direction parallel to said bases toward the opposite one of said walls by moving from the slopes upon which they are being stored along their respective ducts to said opposite wall and coming to rest against it under the urging of said continuous force to form a stable two-dimensional pattern on said opposite wall corresponding to the pattern in which said momentary force was exerted upon said charges.

References Cited

UNITED STATES PATENTS

| | | |
|---|---|---|
| 2,589,601 | 3/1952 | Burnett. |
| 3,036,388 | 5/1962 | Tate. |
| 3,103,751 | 9/1963 | McDonald. |

EUGENE R. CAPOZIO, Primary Examiner

H. S. SKOGQUIST, Assistant Examiner

U.S. Cl. X.R.

40—28

PO-1050
(5/69)

UNITED STATES PATENT OFFICE
CERTIFICATE OF CORRECTION

Patent No. 3,460,276          Dated August 12, 1969

Inventor(s) Errol G. Payne

It is certified that error appears in the above-identified patent and that said Letters Patent are hereby corrected as shown below:

Column 1, line 21 after "path of" insert --the--;
Column 3, line 34, after "partially" insert --powder--;
Column 5, line 1, after "particular" change "membodiment to --embodiment--;
Column 8, lines 69 and 70 delete "of sheets shown in Fig. 7, the planes along which the stack".

SIGNED AND
SEALED
MAR 31 1970

(SEAL)
Attest:

Edward M. Fletcher, Jr.
Attesting Officer

WILLIAM E. SCHUYLER, JR
Commissioner of Patents